US006425472B1

(12) United States Patent
Davis et al.

(10) Patent No.: US 6,425,472 B1
(45) Date of Patent: Jul. 30, 2002

(54) STRIP BARRIER BRUSH ASSEMBLY

(75) Inventors: Chris M. Davis; Michael V. Zinn, both of Midlothian, VA (US)

(73) Assignee: Jason Incorporated, Richmond, VA (US)

( * ) Notice: Subject to any disclaimer, the term of this patent is extended or adjusted under 35 U.S.C. 154(b) by 52 days.

(21) Appl. No.: 09/645,252

(22) Filed: Aug. 24, 2000

(51) Int. Cl.[7] ................................................ B65G 43/00
(52) U.S. Cl. ....................................... 198/323; 198/326
(58) Field of Search .................................. 198/323, 326

(56) References Cited

U.S. PATENT DOCUMENTS

| | | | | |
|---|---|---|---|---|
| 2,193,583 A | | 3/1940 | Dunlop | |
| 2,846,045 A | | 8/1958 | Fowler | |
| 3,616,891 A | | 11/1971 | Eagle | |
| 3,986,595 A | | 10/1976 | Asano et al. | |
| 4,397,383 A | | 8/1983 | James | |
| 4,519,490 A | | 5/1985 | White | |
| D283,444 S | | 4/1986 | Allard | |
| D283,445 S | | 4/1986 | Allard | |
| 4,629,052 A | | 12/1986 | Kitamura | |
| 4,669,597 A | | 6/1987 | Langer et al. | |
| 5,042,641 A | | 8/1991 | Soldat | |
| 5,082,102 A | | 1/1992 | Reichmuth | |
| 5,242,042 A | | 9/1993 | Mauldin | |
| 5,810,147 A | * | 9/1998 | Vanmoor | 198/323 |
| 6,129,197 A | * | 10/2000 | Gore | 198/323 |
| 6,131,719 A | * | 10/2000 | Gore | 198/326 |
| 6,152,279 A | * | 11/2000 | Davis | 198/333 |

FOREIGN PATENT DOCUMENTS

| | | |
|---|---|---|
| GB | 2 069 438 A | 8/1981 |
| JP | 2-123092 A | 5/1990 |
| JP | 3-158387 A | 7/1991 |
| JP | 4-28692 A | 1/1992 |

OTHER PUBLICATIONS

Sealeze Corporation, 1989 Catalog, Date: 1989.
Sealeze Corporation, Escalator Safety Strip Brochure.
The Washington Post, "Metro Using Brushes on Escalator Gap Problem," Sep. 9, 1994.

* cited by examiner

*Primary Examiner*—Christopher P. Ellis
*Assistant Examiner*—Rashmi K. Sharma
(74) *Attorney, Agent, or Firm*—Renner, Otto, Boisselle & Sklar LLP

(57) ABSTRACT

A strip brush moving surface guard is mounted to extend along a fixed surface with the strip brush projecting over the edge of the moving surface to guard the gap between the moving and fixed surfaces. The strip brush includes a base. An elongated holder is secured to the fixed surface and the base and holder are hingedly connected so that the strip brush may yield and pivot or hinge away from the moving surface. The hinge may be an elongated rod and socket connection. When assembled to the fixed surface, the fixed surface acts to block disassembly of the hinge without removal of the holder form the fixed surface.

11 Claims, 2 Drawing Sheets

STRIP BARRIER BRUSH ASSEMBLY

DISCLOSURE

This invention relates generally as indicated to a strip barrier brush assembly, and more particularly to a strip brush moving surface guard for protecting the gap at the lateral edges of the moving surface of a conveyor such as an escalator or walkway.

BACKGROUND OF THE INVENTION

Strip brushes have been used to protect the gap between the fixed side walls and the moving surface for escalators or walkways. The bristle tips usually project over the edge of the moving surface at a downwardly extending angle and nudge people or things away from the gap between the moving and fixed surfaces. Examples may be seen in published UK patent applications 2,343,668A, 2,332,41 1A, and 2,069,438A, as well as U.S. Pat. No. 5,810,147. Both single and double strip brush guards are sold under the trademark SEALEZE® by the Sealeze unit of Jason Incorporated of Richmond, Va., USA. SEALEZE® is a registered trademark of Jason Incorporated.

On occasion an object or even a person's appendage such as a shoe tip may get caught beneath the brush guard or exert a moment of force on the guard so that something may get caught or become wedged between the moving surface and guard, and not be nudged away from the gap. This is particularly true in escalators where the step tread extends horizontally and the brush guard is inclined. Accordingly, it would be beneficial if the brush guard would yield when subjected to certain moments or forces. It would also be beneficial if the brush guard could be attached to the fixed side wall with a hinge connection so that the strip brush would be capable of hinging or swinging away from the moving surface, but not in such a manner that it could readily be detached or vandalized.

SUMMARY OF THE INVENTION

A strip barrier brush moving surface guard is mounted on a fixed surface with the strip brush projecting over the edge of the moving surface to guard the gap between the fixed and moving surface. The strip brush is folded about a core wire and clinched, and then assembled in a slot in an elongated base. An elongated holder is mounted on the fixed surface, and the base and holder are hinged so that the strip brush and base may yield and pivot or hinge away from the moving surface when certain force moments are applied to the strip brush.

The hinge may be an elongated rod and socket connection and the parts may be assembled by snapping together. When assembled to the fixed surface the fixed surface acts to block disassembly of the hinge connection so that the assembly cannot be disconnected unless the holder is first removed from the fixed surface. This acts to protect the assembly from tampering or vandalism.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
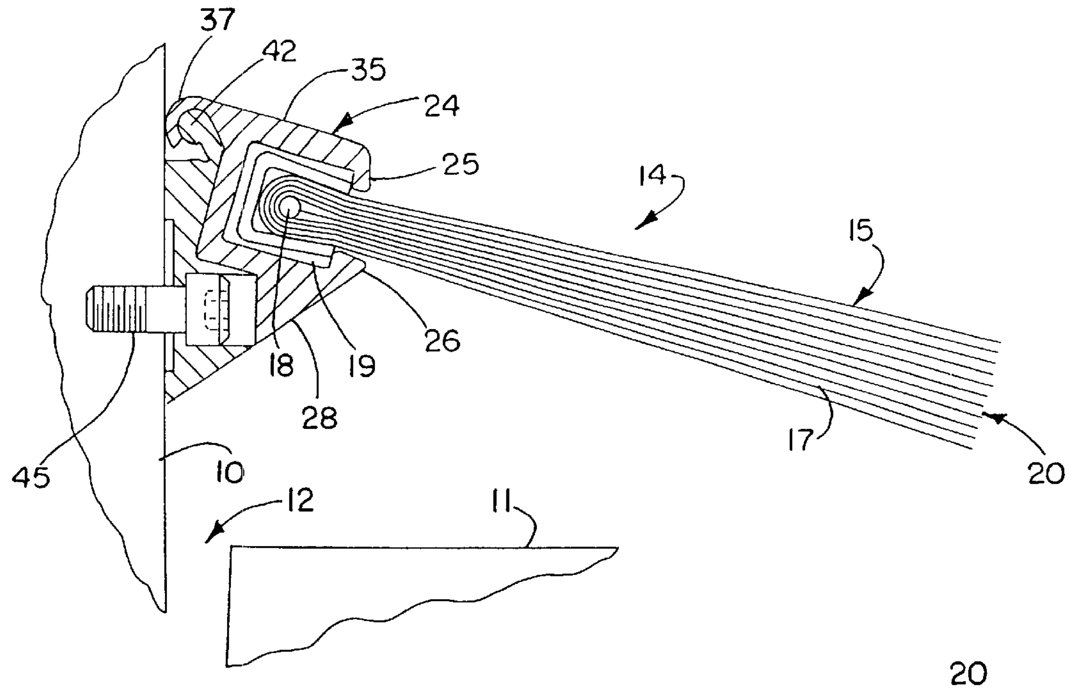
FIG. 1 is a transverse section of a strip brush moving surface guard in normal position with respect to the moving surface.
Figure 2:
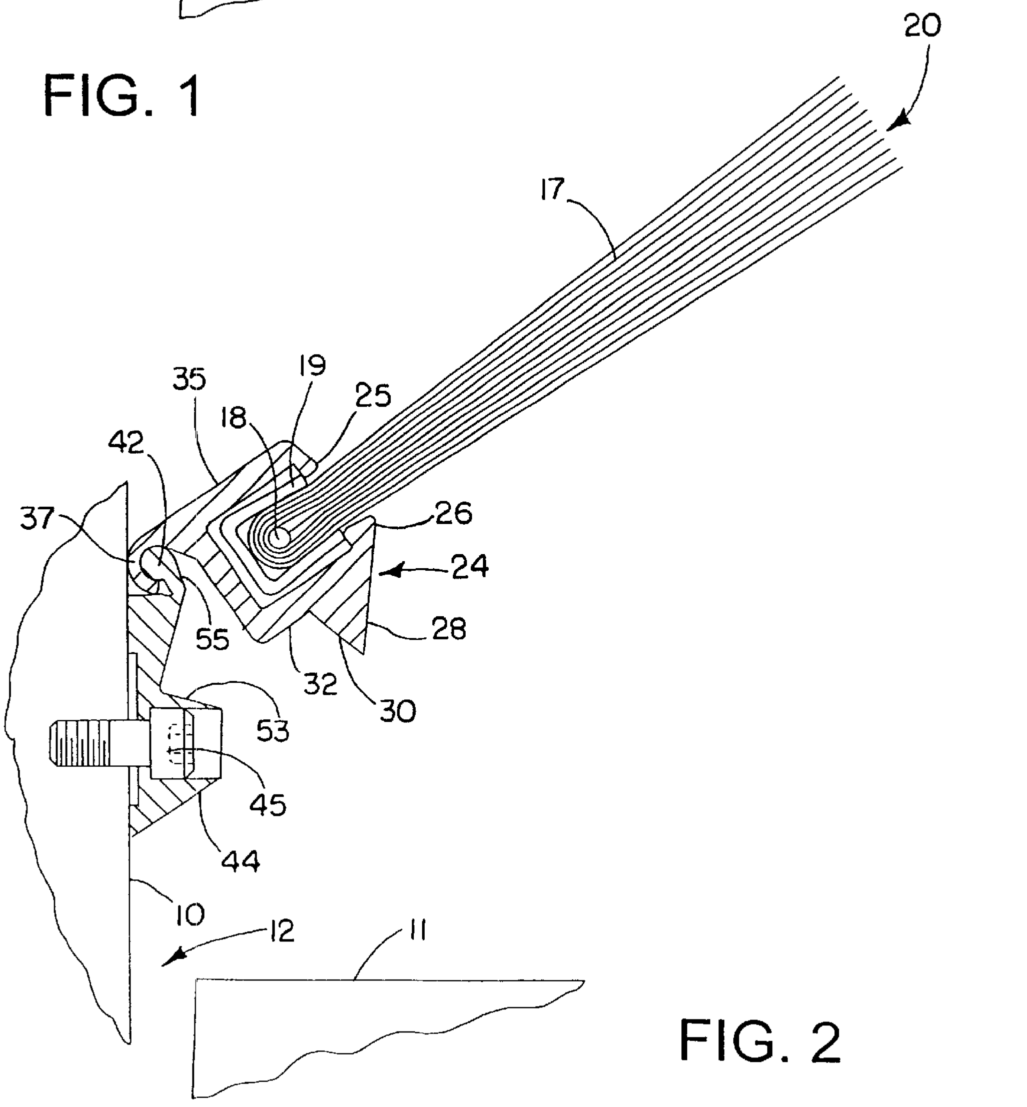
FIG. 2 is a similar section but showing the strip brush hinged away from the moving surface.

Referring initially to FIGS. 1 and 2 there is illustrated a fixed surface 10 and a moving surface 11 with a gap 12 therebetween. The brush guard is shown generally at 14 and includes a strip brush 15 projecting downwardly at a relatively slight angle over the edge of the moving surface 11 and of course the gap. The opposite edge of the moving surface has a strip brush guard assembly that is a mirror image of the one illustrated.

The strip brush 15 may be formed of plastic bristles 17 folded around a core wire 18 and clinched at the fold by channel 19. The strip brush has a trimmed face 20 which will engage an object or people nudging them away from the gap. The channel and core wire may be plastic or metal.

Figure 3:
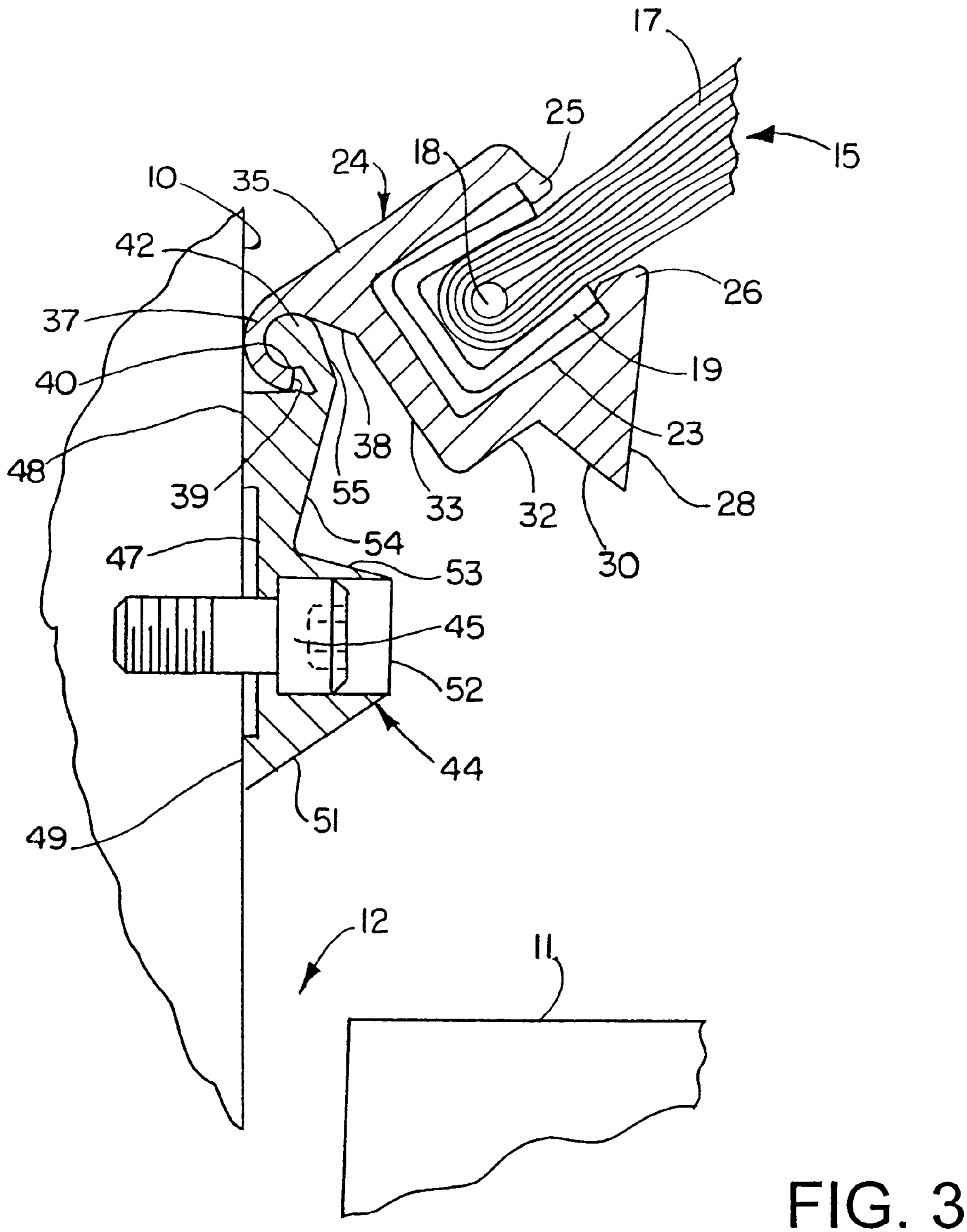
FIG. 3 is a fragmentary enlarged section of the hinge assembly showing its cooperation with the fixed surface.

Referring now additionally to FIG. 3, the strip brush is inserted or threaded in channel 23 in brush base shown generally at 24. The channel is generally rectangular and the open end or slot through which the bristles project is restricted by inwardly projecting upper lip 25 and lower lip 26. This holds the strip brush in place. As illustrated the lips are somewhat asymmetrical with the lower lip 26 being larger and projecting somewhat farther. This provides better support for the projecting strip brush.

From the enlarged lower lip 26 the bottom of the base includes a sloping bottom surface 28 which intersects vertical surface 30 which extends upwardly to a shoulder surface 32 parallel to the axis of the strip brush 15 and channel 23. The shoulder surface terminates through a rounded corner in a rear surface 33 transverse the axis of the brush and which forms the back of the base. The base includes a top surface 35 parallel to the brush and channel axis.

As seen more clearly in FIG. 3 the surfaces 33 and 35 merge to form a hollow cylindrical hinge element 37. The upper portion of the rear surface tapers into the hollow cylindrical interior of the hinge element as seen at 38. The hinge element extends circularly at the uniform thickness to its end or stop 39 slightly more that 180° about its center. The inner surface of the hinge element is tangent to the taper 38 while the outer surface is tangent to the top surface 35 of the base. The inner distal edge of the hollow hinge element shown at 40 is spaced from the taper surface 38 slightly less than the interior diameter of the hinge element.

The hollow hinge element 37 is designed to snap-on elongated rod hinge element or pintle 42 projecting from holder 44 which is secured to the fixed surface 10 by headed fasteners 45.

The holder 44 includes a rear surface 47 slightly spaced from the fixed surface by elongated top and bottom feet 48 and 49, respectively. The holder includes a bottom sloping surface 51 which is aligned with the bottom sloping surface 28 of the base 24 when the base is in the normal position as seen in FIG. 1. The holder includes a vertical surface 52 in which the headed fasteners 45 are countersunk. The front of the holder includes a shoulder surface 53 which mates with the surface 32 of the base in the normal position of FIG. 1, and a front surface 54 which mates with the rear surface 33 in such position.

Projecting from the upper end of the holder is the elongated ball or rod pintle 42. The rod pintle is on the end of stem 55 which projects upwardly from the front of the holder at a rearwardly inclined angle. This places the pintle 42 close to the fixed surface 10 so that such fixed surface is substantially tangent to the exterior of the hollow cylindrical hinge element 37 in the assembled condition. In order to separate the hinge elements the hollow element has to be snapped off the pintle in the rearwardly inclined direction of the stem 55, but when assembled, the fixed surface 10 blocks such movement so that to take the hinge apart the holder has to be removed from the fixed surface 10. The rear surface of the stem also acts as a stop limiting the upward hinging movement of the base as seen in FIG. 2.

It will also be noted that when in normal position as seen in FIG. 1, the weight of the base and brush as well as any vertical load is taken up primarily by the interfitting shoulder surfaces 32 and 53. In such position the fasteners and any recesses therefore are concealed by the base. Both the base and holder may be metal or plastic extrusions. Also it will be appreciated that the base may accommodate two or parallel strip brushes as shown in U.K. patent publication 2343668 A.

It can now be seen that there is provided a strip brush moving surface guard where the brush will yield or hinge away from the moving surface as seen by comparing FIGS. 1 and 2.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only be the scope of the claims.

What is claimed is:

1. A strip brush moving surface edge guard mounted on a fixed surface and projecting over the edge of the moving surface, said guard comprising a strip brush projecting over the edge of the moving surface, a base for the strip brush, an elongated holder for the guard mounted on the fixed surface, and hinge means connecting the base and the mounting holder so that a force on the strip brush will cause the strip brush to swing away from the moving surface.

2. A strip brush guard as set forth in claim 1 comprising a projecting elongated pintle extending upwardly from the mounting holder, said base including a hollow partial cylinder fitting over said pintle to enable the strip brush to swing as aforesaid.

3. A strip brush guard as set forth in claim 2 wherein said pintle is spaced from said fixed surface trapping the hollow partial cylinder between the fixed surface and pintle.

4. A strip brush as set forth in claim 3 wherein the fixed surface is substantially tangent to the hollow cylinder and prevents disassembly of the hinge when the holder is secured to the fixed surface.

5. A strip brush guard as set forth in claim 1 including a stop limiting the swing movement of said strip brush away from the moving surface.

6. A strip brush guard as set forth in claim 1 including a two-part snap-on hinge formed by said holder and base hinging the holder and base together.

7. A strip brush guard as set forth in claim 1 wherein said holder and base include a mating step in the normal position of said base.

8. A strip brush guard as set forth in claim 7 wherein said holder and base have aligned bottom surfaces in the normal position of the base.

9. A strip brush guard as set forth in claim 1 including fasteners for said holder securing said holder to the fixed surface, said base concealing said fasteners the normal position of the base.

10. A strip brush guard as set forth in claim 1 including a channel having a lower and upper edge with a restricted opening in said base, and a strip brush mounted in said channel.

11. A strip brush guard as set forth in claim 10 wherein said restricted opening is asymmetrical with the lower edge of the channel opening projecting farther than the upper edge.

* * * * *